United States Patent Office 2,872,470
Patented Feb. 3, 1959

2,872,470
PRODUCTION OF METAL ALKYLS

Hugh Wilma Boulton Reed and William Roy Smith, Norton-on-Tees, England, assignors to Imperial Chemical Industries Limited, London, England, a corporation of Great Britain No Drawing. Application May 28, 1956
Serial No. 587,444

Claims priority, application Great Britain June 6, 1955

14 Claims. (Cl. 260—448)

This invention relates to the production of metal alkyls.

In co-pending U. S. application Serial No. 469,037, which has issued as U. S. Patent No. 2,839,555 on June 17, 1958, a process for the production of a complex metal alkyl has been described in which a complex hydride of aluminium and of an alkali metal is reacted at elevated temperature and substantially in the absence of moisture and oxygen, with one or more olefines containing not more than 12 carbon atoms and having the general formula $R.CH:CH_2$ where R denotes hydrogen or an alkyl group, in the presence of a Friedel-Crafts type catalyst.

By the terms "complex metal alkyl" or "complex hydride" is meant an alkyl or hydride in which the alkyl groups or hydrogen atoms are combined with aluminium and an alkali metal.

We have now found that the reaction of a complex hydride of aluminium and of an alkali metal with one or more olefines as hereinbefore defined can be catalysed by a wide variety of substances which are not catalysts for Friedel-Crafts type reactions.

According to the invention therefore there is provided a process for the production of a complex metal alkyl in which a complex hydride of aluminium and of an alkali metal is reacted at elevated temperature and substantially in the absence of moisture and of oxygen with one or more olefines containing not more than 12 carbon atoms and having the general formula $R.CH:CH_2$ where R denotes hydrogen or an alkyl group, in the presence of an inorganic salt selected from the halides, sulphates, nitrates, carbonates, cyanides and phosphates of ammonium and metals of groups I and II of the periodic system.

Examples of inorganic salts which are very suitable for use in the process are lithium chloride, potassium iodide, mercuric chloride, calcium carbonate, sodium carbonate, barium carbonate, potassium cyanide, potassium di-hydrogen phosphate, sodium chloride, silver iodide, potassium sulphate, sodium sulphate, silver nitrate and ammonium nitrate. It is preferred to use a salt selected from potassium iodide, sodium chloride, sodium sulphate, potassium sulphate, barium carbonate and mercuric chloride.

Complex hydrides of aluminium and of either lithium or sodium are particularly suitable for use in the process of the invention. We prefer to use a complex hydride of aluminium and of lithium.

If only one olefine, as hereinbefore defined, is used in the process of the invention, a complex metal alkyl is produced in which the alkyl groups are identical while if two or more olefines, as hereinbefore defined, are used, the complex metal alkyl may contain different alkyl groups.

In carrying out the process of the invention the reactants should be substantially free from moisture, and moisture and air should be excluded from the apparatus in order to avoid undesired decomposition of the complex hydride or alkyl. It is also desirable to use an excess of olefine over the quantity theoretically required to react with the complex hydride to ensure that the complex hydride reacts completely and thereby facilitate the isolation of the complex metal alkyl in a susbtantially pure form.

The temperature at which the reaction is carried out should preferably not be less than about 50° C. to ensure a reasonably rapid rate of reaction and it should not exceed the temperature at which the complex hydride decomposes or at which loss of olefine from the complex metal alkyl occurs under the conditions of the reaction. For example, lithium aluminium tetrapropyl is stable up to 250° C. at atmospheric pressure while in the presence of propylene it is stable up to at least 300° C. Lithium aluminium tetraoctyl is stable up to at least 250° C. at atmospheric pressure. It is preferred to carry out the reaction within the temperature range 50° to 300° C.

If the olefine is liquid at the reaction temperature the reaction may be carried out at atmospheric pressure. If the olefine is gaseous at the reaction temperature the reaction should be carried out at elevated pressure and we have found that a suitable pressure is that autogenously developed by the olefine at the temperature employed. Higher pressures may however be used.

Preferably, the reaction is carried out in the presence of a solvent inert under the reaction conditions, such as paraffinic and alicyclic hydrocarbons. Examples of suitable solvents are n-octane, decahydronaphthalene and cyclohexane.

The quantity of inorganic salt used may vary within wide limits but should not be less than 0.1 percent by weight of the complex hydride used. We prefer to use about 0.5 percent to about 10 percent by weight of the complex hydride.

Example 1

2 grams lithium aluminium hydride, 20 ml. decahydronaphthalene and 0.02 gram of one of the salts listed in the table below were introduced into a stainless steel autoclave, the autoclave exhausted and then charged with ethylene to a pressure of 40–42 atmospheres. Moisture was excluded from the apparatus. After charging the ethylene the autoclave was rocked and heated at 120° C. for 5 hours, the autoclave then cooled and the solid product separated. The yields of lithium aluminium tetra-ethyl obtained are expressed in the following table as a percentage of the theoretical yield based on the weight of lithium aluminium hydride initially present.

| Experiment No. | Catalyst | Yield, percent |
| --- | --- | --- |
| 1 | Lithium chloride | 89 |
| 2 | Potassium iodide | 96 |
| 3 | Mercuric chloride | 96 |
| 4 | Calcium carbonate | 93 |
| 5 | Sodium carbonate | 82 |
| 6 | Barium carbonate | 95 |
| 7 | Sodium sulphate | 98 |
| 8 | Potassium sulphate | 98 |
| 9 | Sodium chloride | 100 |

Example 2

0.5 gram lithium aluminium hydride, 20 ml. decahydronaphthalene and 0.005 gram of silver iodide were introduced into a stainless steel autoclave, the autoclave exhausted and then charged with ethylene to a pressure of 39 atmospheres. Moisture was excluded from the apparatus. After charging the ethylene the autoclave was rocked and heated at 120° C. for 3 hours, the autoclave then cooled and the solid product separated. The yield of lithium aluminium tetra-ethyl obtained was 84% of the theoretical yield based on the weight of lithium aluminium hydride initially present.

We claim:

1. A process for the production of an alkali metal aluminium alkyl which comprises reacting an alkali metal aluminium hydride at elevated temperature and substantially in the absence of moisture and oxygen with at least one olefine containing less than 13 carbon atoms having the general formula R.CH:CH$_2$ in which R is a monovalent radical selected from the group consisting of hydrogen and alkyl radicals, in the presence of an inorganic salt selected from the group consisting of the halides, sulphates, nitrates, carbonates, cyanides and phosphates of ammonium and alkali metals said elevated temperature not exceeding the temperature at which the complex hydride decomposes and loss of olefine from the complex alkyl occurs under the conditions of the reaction.

2. The process of claim 1 wherein said inorganic salt is an alkali metal iodide.

3. The process of claim 2 wherein said inorganic salt is potassium iodide.

4. The process of claim 1 wherein said inorganic salt is a chloride.

5. The process of claim 4 wherein said inorganic salt is sodium chloride.

6. The process of claim 1 wherein said inorganic salt is an alkali metal sulphate.

7. The process of claim 6 wherein said inorganic salt is sodium sulphate.

8. The process of claim 6 wherein said inorganic salt is potassium sulphate.

9. The process of claim 1 wherein the amount of said inorganic salt is between 0.5 and 10% by weight of said hydride.

10. The process of claim 9 wherein said temperature is within the range of 50° C. to 300° C.

11. The process of claim 10 wherein said reaction is carried out at superatmospheric pressure.

12. The process of claim 11 wherein said olefine is used in an amount which is greater than the amount theoretically required to react with said hydride.

13. The process of claim 1 wherein said reaction is carried out in the presence of a solvent which is inert under the reaction conditions, said solvent being selected from the group consisting of paraffinic and alicyclic hydrocarbons 14. The process of claim 1 wherein said temperature does not exceed 300° C.

References Cited in the file of this patent

UNITED STATES PATENTS 2,638,486   Chiddix et al. _____ May 12, 1953

FOREIGN PATENTS 917,006    Germany _____ Aug. 23, 1954
1,113,546  France _____ Mar. 30, 1956
201,109    Australia _____ Feb. 17, 1956

OTHER REFERENCES

Ziegler: Angewandte Chemie, pages 323–329, June 21, 1952.